United States Patent [19]

Kambara et al.

[11] Patent Number: 4,537,950
[45] Date of Patent: Aug. 27, 1985

[54] POLYVINYLENE SULFIDE AND POLYVINYLENE SELENIDE

[75] Inventors: Shu Kambara, Tokyo; Tatsumi Arakawa, Fuji; Akio Takahashi, Otsu, all of Japan

[73] Assignee: Director-General of Agency of Industrial Science and Technology, Tokyo, Japan

[21] Appl. No.: 471,152

[22] Filed: Mar. 1, 1983

[30] Foreign Application Priority Data

Apr. 14, 1982 [JP] Japan ................................. 57-60943

[51] Int. Cl.$^3$ .............................................. C08L 81/02
[52] U.S. Cl. .................................... 528/380; 526/286; 528/388

[58] Field of Search ............... 528/388, 397, 392, 380; 526/286

[56] References Cited

FOREIGN PATENT DOCUMENTS 580184  8/1946  United Kingdom ................ 528/388

Primary Examiner—Christopher A. Henderson
Attorney, Agent, or Firm—Cushman, Darby & Cushman

[57] ABSTRACT

A novel polyvinylene chalcogenide of the formula: $-CH{=}CH-L)_n$ wherein L is S or Se, is provided. This compound is prepared by reacting an ethylene dihalide of the formula: $XHC{=}CHX'$ (X and X' are selected from F, Cl, Br and I) with an alkali metal chalcogenide or bichalcogenide.

9 Claims, No Drawings

POLYVINYLENE SULFIDE AND POLYVINYLENE SELENIDE

BACKGROUND OF THE INVENTION

1. Field of the Invention

This invention relates to a novel polyvinylene chalcogenide represented by the following structural formula:

$$-CH=CH-L)_n$$

wherein L stands for sulfur or selenium, and a process for the preparation thereof.

2. Description of the Prior Art

A so-called polyethylene chalcogenide having the following structural formula:

$$-CH_2-CH_2-L)_n$$

wherein L stands for sulfur or selenium, is well known. However, a chalcogenide polymer of the present invention having a structure in which two subsequent carbon atoms are connected through the double bond has not been known. The chalcogenide polymer having this structure is a novel polymer having peculiar electric characteristics.

SUMMARY OF THE INVENTION

A primary object of the present invention is to provide a novel polyvinylene chalcogenide which is valuable as electric materials.

The novel polyvinylene chalcogenide of the present invention is represented by the following structural formula (I):

$$-CH=CH-L)_n \qquad (I)$$

wherein L stands for sulfur or selenium.

The polyvinylene chalcogenide of the present invention can be prepared by reacting an 1,2-dihaloethylene represented by the following formula (II):

$$XHC=CHX' \qquad (II)$$

wherein X and X' stand for a member selected from F, Cl, Br and I, with an alkali metal chalcogenide represented by the following formula (III):

$$M_2L$$

wherein M is an alkali metal and L is the same as defined above, or an alkali metal bichalcogenide represented by the following formula (IV):

$$MHL$$

wherein M and L are the same as defined above and H is hydrogen.

DESCRIPTION OF THE PREFERRED EMBODIMENTS

The reaction of the 1,2-dihaloethylene of the formula (II) with the alkali metal chalcogenide of the formula (III) or the alkali metal bichalcogenide (i.e., alkali metal hydrogenchalcogenide) of the formula (IV) is preferably carried out in a solvent, more preferably an organic amide solvent, and preferably in the presence of an alkali metal carboxylate.

As the 1,2-dihaloethylene of the formula (II), there are used compounds containing fluorine, chlorine, bromine or iodine, and compounds containing chlorine or bromine, that is, dichloroethylene and dibromoethylene, are preferred. Each of these compounds includes cis- and trans-isomers, but both the isomers and mixtures thereof may be used in the present invention. As the alkali metal chalcogenide, there is used sulfide or selenide of sodium, potassium, lithium, rubidium or cesium and L stands for sulfur or selenium. The alkali metal chalcogenide used in the present invention includes an anhydrous chalcogenide and a hydrated chalcogenide. A preferred alkali metal chalcogenide is sodium sulfide or sodium selenide. Another important chalcogen element supply source is an anhydrous or hydrated bichalcogenide of lithium, sodium, potassium, rubidium or cesium or a mixture of such bichalcogenides. The molar ratio of the 1,2-dihaloethylene of the formula (II) to the chalcogen compound (III) or (IV) is preferably such that the amount of the 1,2-dihaloethylene is one mole per gram-atom of the divalent chalcogen atom, but this ratio may be varied in the range of from 0.8 to 2.

As the alkali metal carboxylate that is preferably used in the present invention, there can be mentioned, for example, lithium acetate, sodium acetate, potassium acetate, lithium propionate, rubidium butyrate and sodium benzoate, though the alkali metal carboxylates that can be used in the present invention are not limited to those exemplified above. As the organic amide compound used as the reaction medium in the present invention, there may be used cyclic and non-cyclic compounds, and those having 1 to 10 carbon atoms are preferably used. For example, there can be mentioned formamide, acetamide, hexamethylene sulfonamide, 2-pyrrolidone, N-methyl-2-pyrrolidone, ε-caprolactam and 1,3-dimethyl-2-imidazolidione. From the viewpoint of the rate of reaction, it is preferred that the reaction be carried out at a high temperature. However, at too high a temperature, a side reaction and a decomposition reaction take place. Accordingly, the reaction is carried out preferably at 60° to 250° C., more preferably 80° to 200° C. The reaction may be carried out under atmospheric pressure, but it is preferred that the reaction be carried out under an elevated pressure of 1 to 10 kg/cm².

The polyvinylene chalcogenide of the present invention can also be prepared by the ring-opening polymerization of a cyclic chalcogenide such as thiirene,

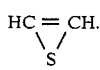

Thiirene can be synthesized by photo-decomposition of 1,2,3-thiadiazole [see J. Organic Chemistry, 43, 12, 2490 (1978)], but this compound is very unstable and the synthesis is difficult. Therefore, the aforementioned process of reacting the ethylene dihalide with the alkali metal chalcogenide or bichalcogenide is preferred.

The polyvinylene chalcogenide of the present invention is a novel chalcogen element-containing polymeric compound having a structure in which vinyl groups are connected through thioether or selenoether linkages. This compound is obtained in the form of a powder having a bright black color, and from the results of the thermal analysis, it is confirmed that it shows no definite transistion point at temperatures of up to 400° C. This compound is insoluble in most polar solvents and nonpolar solvents, such as water, alcohols, dimethylformamide, acetone, carbon disulfide and toluene. As is illustrated in Examples given hereinafter, the polymeric compound of the present invention can be identified by the IR spectrum according to the KBr powder method, the $^{13}$C solid NMR spectrum and the elementary analysis. For further confirmation, it is preferred that the thermal analysis and X-ray diffractometry be adopted in combination with the foregoing identification methods. By dint of the specific structure, the polymeric compound of the present invention has peculiar electric properties. More specifically, the polymeric compound per se is a semiconductor, and if an oxidizing or reducing impurity is incorporated in the polymeric compound, a metallic electroconductivity is manifested. The polymeric compound having such characteristics is very valuable as an electric material.

The present invention will now be described in detail with reference to the following Examples.

EXAMPLE 1

60 g of Na$_2$S.9H$_2$O was incorporated in 100 ml of N-methylpyrrolidone, and the mixture was heated at 140° C. for 4 hours under purging with argon gas. The mixture was further heated at 170° C. for 2 hours to effect substitution with argon completely and simultaneously effect dehydration. Then, 20.5 ml of 1,2-dibromoethylene (the cis/trans ratio was 1/1) was added to the mixture, and the mixture was heated at 180° C. for 48 hours in an argon stream to obtain a black precipitate. The black precipitate was sufficiently washed with water, acetone and then toluene to be thereby refined and finally dried to obtain polyvinylene sulfide in the form of a black powder. The black powder was not or only slightly soluble in polar and nonpolar solvents such as water, alcohols, dimethylformaide, acetone, carbon disulfide and toluene. The thermal analysis revealed that the powder did not exhibit any definite transition point at temperatures of up to 400° C., from which it was confirmed that the degree of polymerization was considerably high. Results of other identification analyses are described below.

In the IR spectrum according to the KBr powder method, an olefinic C-H stretching vibration indicating the presence of the carbon-to-carbon double bond was observed at 3,080 cm$^{-1}$, an IR absorption due to the carbon-to-carbon double bond was observed at 1,600 cm$^{-1}$, and an IR absorption inherent in the sulfur-containing compound was observed at 700 cm$^{-1}$. In the $^{13}$C-NMR spectrum, a peak indicating the presence of the carbon-to-carbon double bond was observed at 131 ppm. From the results of the elementary analysis, it was confirmed that the carbon, hydrogen and sulfur contents were 40.4%, 3.65% and 55.94%, respectively, and these values were very close to the calculated carbon, hydrogen and sulfur contents of 41.36%, 3.44% and 55.20%, respectively. In the X-ray diffractometry according to the powder method, diffraction peaks were observed at d values of 1.93, 2.70, 2.84 and 3.98.

EXAMPLE 2

A pressure reaction vessel was charged with 9 g of Na$_2$S.9H$_2$O and 15 ml of N-methylpyrrolidone, and in the same manner as described in Example 1, substitution with argon and dehydration were carried out under heating. Then, 3.6 g of 1,2-dichloroethylene (composed completely of the transisomer) which had been subjected to the oxygen-removing treatment in advance and the above-mentioned solution of Na$_2$S in N-methylpyrrolidone were heated at 150° C. under a pressure of 5 atmosphere for 72 hours in the sealed pressure reaction vessel to obtain a black precipitate. In the same manner as described in Example 1, the black precipitate was washed and dried to obtain polyvinylene sulfide in the form of a black powder. This black powder was almost insoluble and infusible as the black powder obtained in Example 1, and it was considered that the degree of polymerization was high. Results of other identification analyses are described below.

In the IR spectrum according to the KBr powder method, an olefinic C-H stretching vibration was observed at 3,075 cm$^{-1}$, IR absorptions similar to those observed in Example 1 were observed at 1,600 cm$^{-1}$ and 700 cm$^{-1}$. In the $^{13}$C-NMR spectrum, a peak indicating the presence of the carbon-to-carbon double bond was observed at 132 ppm. From the results of the elementary analysis, it was confirmed that the carbon/hydrogen/sulfur atomic ratio was 1.98/2.04/1.02, which was very close to the calculated atomic ratio of 2/2/1. The results of the X-ray diffractometry were in agreement with those obtained in Example 1.

EXAMPLE 3

A pressure reaction vessel having a capacity of 1 liter and being capable of resisting a pressure of up to 10 kg/cm$^2$ was charged with 150 ml of N-methyl-2-pyrrolidone, 24 g of Na$_2$S.9H$_2$O and 2 g of CH$_3$COONa.3-H$_2$O. One valve of the reaction vessel was opened and a condenser was attached thereto. The mixture was heated to 230° C. for 3.5 hours under purging with N$_2$ at a rate of 1000 cc/min to effect dehydration. Then, the temperature was gradually lowered to 100° C., and 18 g of dibromoethylene was gradually added. The reaction vessel was sealed and polymerization was carried out with stirring at 170° to 180° C. (the inner pressure being 1.0 to 1.4 kg/cm$^2$) for 51 hours. The obtained polymerization liquid was added to 500 ml of water to obtain a black precipitate. The black precipitate was recovered by filtration, washed with water several times, washed with methanol and dried at room temperature in vacuo to obtain 3.7 g (the yield being 64%) of a bright black powder.

The so-obtained bright black compound had an absorption at 1,600 cm$^{-1}$ in the infrared absorption spectrum and an absorption at 134 ppm in the $^{13}$C solid NMR spectrum, both the absorptions being considered to be due to the vinylene group. Furthermore, the light absorption band was extended to the long wavelength side to up to about 1,500 nm.

In the thermal analysis, a very weak endothermic peak was observed in the temperature range of 220° to 440° C. in nitrogen, and a strong exothermic peak was observed in the temperature range of 450° to 550° C. in air. In the thermobalance analysis, in nitrogen, reduction of the weight was gradually caused at 200° C., but about 50% was left even if the temperature exceeded 1,000° C. In air, the compound was stable at temperatures of up to 200° C. and no change of the weight was observed. From the results of the elementary analysis, it was confirmed that the compound contained C, S and H and minute amounts of N and O and that the C/H/S atomic ratio was 2.2/1.8/1, which was very close to the value of 2/2/1 calculated from —CH=CH—S)$_n$.

The electroconductivity of the polymer was $10^{-10}$ S/cm, which was enhanced to $10^{-5}$ S/cm by doping with iodine.

EXAMPLE 4

A pressure reaction vessel having a capacity of 1 liter and being capable of resisting a pressure of up to 10 kg/cm² was charged with 150 ml of N-methyl-2-pyrrolidone and 2 g of CH₃COONa.3H₂O. One valve of the reaction vessel was opened and a condenser was attached thereto. The mixture was heated to 230° C. for 3.5 hours under purging with N₂ at a rate of 1,000 cc/min to effect dehydration. Then, the temperature was lowered to 100° C. and 9.0 g of Na₂Se and 15 g of dibromoethylene were gradually added. Then, the reaction vessel was sealed and polymerization was carried out at 170° to 180° C. (the inner pressure being 1.0 to 1.4 kg/cm²) for 37 hours with stirring. The polymerization liquid was incorporated into 500 ml of water to obtain a black precipitate. The black precipitate was recovered by filtration, washed with water several times, washed with methanol and dried at room temperature in vacuo to obtain 5.4 g (the yield being 72%) of a bright black powder.

In the infrared absorption spectrum, the so-obtained bright black compound exhibited an absorption at 1,600 cm⁻¹, which was considered to be due to the vinylene group. The polymer had an electroconductivity of $10^{-11}$ S/cm, which was enhanced to $10^{-5}$ S/cm by doping with iodine.

We claim:

1. A polyvinylene chalcogenide represented by the following structural formula (I):

$$-CH=CH-L)_n \qquad (I)$$

wherein L stands for sulfur or selenium.

2. A polyvinylene chalcogenide represented by the following structural formula (I):

$$-CH=CH-L)_n \qquad (I)$$

wherein L stands for sulfur or selenium, wherein said polyvinylene chalcogenide is prepared by reacting a 1,2-dihaloethylene represented by the following formula (II):

$$XHC=CHX' \qquad (II)$$

wherein X and X' are F, Cl, Br, or I, with an alkali metal chalcogenide represented by the following formula (III):

$$M_2L$$

wherein M is an alkali metal and L is sulfur or selenium or an alkali metal bichalcogenide represented by the following formula (IV):

$$MHL$$

wherein M and L are the same as defined above and H is hydrogen wherein the molar ratio of the 1,2-dihaloethylene to the chalcogenide or bichalcogenide is in the range of from 0.8 to 2.

3. A polyvinylene chalcogenide represented by the following structural formula (I):

$$-CH=CH-L)_n \qquad (I)$$

wherein L stands for sulfur or selenium, wherein said polyvinylene chalcogenide is in the form of a powder having a bright black color and having no definite transition point at a temperature of up to 400° C.

4. A polyvinyl sulfide having the formula $(CH=CH-S)_n$ and said polyvinylene sulfide exhibits, in the infrared spectrum, an absorption due to an olefinic C—H stretching vibration observed at 3.080 cm⁻¹, an absorption due to a carbon-to-carbon double bond at 1,600 cm⁻¹ and an absorption inherent in the sulfur-containing compound at 700 cm⁻¹, exhibits, in the ¹³C-NMR spectrum, a signal due to an alkenic carbon observed at 131 ppm; contains 40.4% of carbon, 3.65% of hydrogen and 55.94% of sulfur; and has diffraction peaks at a value of 1.93, 2.70, 2.84 and 3.98 in the X-ray diffractometry.

5. A polyvinylene sulfide having the formula $(CH=CH-S)_n$ and said polyvinylene sulfur exhibits, in the infrared spectrum, an absorption due to an olefinic C—H stretching vibration observed at 3,075 cm⁻¹, an absorption due to a carbon-to-carbon double bond at 1,600 cm⁻¹ and an absorption inherent in the sulfur-containing compound at 700 cm⁻¹, exhibits, in the ¹³C-NMR spectrum, a signal due to an alkenic carbon observed at 132 ppm; has a carbon/hydrogen/sulfur atomic ratio of 1.98/2.04/1.02; and has diffraction peaks at values of 1.93, 2.70, 2.84, and 3.98 in the X-ray diffractometry.

6. A polyvinylene sulfide having the formula $(CH-CH-S)_n$ and said polyvinylene sulfide exhibits an absorption due to a carbon-to-carbon double bond at 1,600 cm⁻¹ in the infrared spectrum; exhibits a signal due to an alkenic carbon observed at 131 ppm in the ¹³C-NMR spectrum; and has a carbon/hydrogen/sulfur of 2.2/1.8/1.

7. A polyvinylene selenide having the formula selenide having and said polyvinylene chalcogenide exhibits an absorption due to a carbon-to-carbon double bond at 1,600 cm⁻¹ in the infrared spectrum.

8. A polyvinylene chalcogenide according to claim 1 wherein L is sulphur.

9. A polyvinylene chalcogenide according to claim 1 wherein L is selenium.

* * * * *